United States Patent
Vodermayer

(10) Patent No.: US 6,649,264 B1
(45) Date of Patent: Nov. 18, 2003

(54) COMPOUND MATERIAL COMPRISING FIBERS WHICH ARE EMBEDDED IN A THERMOPLASTIC

(75) Inventor: Albert Maria Vodermayer, Dietlikon (CH)

(73) Assignees: Sulzer Innotec AG, Winterthur (CH); Sika AG, Zurich (CH)

( * ) Notice: Subject to any disclaimer, the term of this patent is extended or adjusted under 35 U.S.C. 154(b) by 123 days.

(21) Appl. No.: 09/665,000

(22) Filed: Sep. 18, 2000

(30) Foreign Application Priority Data

Sep. 23, 1999 (EP) .............................. 99810854

(51) Int. Cl.⁷ ................................ D02G 3/00
(52) U.S. Cl. .................. 428/392; 428/372; 428/379; 428/389; 428/394; 428/395; 428/74; 428/292.1; 428/306.6
(58) Field of Search ............. 428/292.1, 306.6, 428/372, 373, 379, 389, 367, 392, 394, 315, 74, 395

(56) References Cited

U.S. PATENT DOCUMENTS 5,275,883 A    1/1994   Leone et al. .................. 428/373
5,888,580 A  * 3/1999   Hinrichsen et al. ............ 427/8

FOREIGN PATENT DOCUMENTS

EP    0579047 A1    1/1994
GB    2202182 A     9/1988

* cited by examiner

Primary Examiner—Merrick Dixon
(74) Attorney, Agent, or Firm—Townsend and Townsend and Crew, LLP

(57) ABSTRACT

A compound material including fibers which are embedded in a thermoplastic matrix has a free surface to be treated. The material has one or more capillary spaces extending between the fibers, which spaces are at least partly formed by communicating pores and which are open towards the free surface. An average diameter of the pores is greater than, equal to or not substantially less than the fiber diameter.

14 Claims, 2 Drawing Sheets

COMPOUND MATERIAL COMPRISING FIBERS WHICH ARE EMBEDDED IN A THERMOPLASTIC

BACKGROUND OF THE INVENTION

The invention relates to a compound material comprising fibers which are embedded in a thermoplastic matrix, to a method for its manufacture and to uses of the compound material.

DE-A-41 21 915 describes a pressure impregnation, namely a method for impregnating an endless reinforcement fiber strand with a thermoplastic polymer. In this method the fiber strand is first impregnated with the particles in a bath which contains a dispersion of solid fiber thermoplastic particles. After the impregnation bath the dispersing agent is evaporated out of the impregnated fiber strand in a drying oven. Then the dry fiber strand is passed through a melting furnace in which the particles melt. After a consolidation a fiber compound material in the form of a small band with a solid thermoplastic or polymer matrix is present. Sections can be manufactured of a bundle of such small bands by means of a pultrusion. Through the pultrusion process, in which the thermoplastic is temporarily melted again, a dense, pore-poor polymer matrix arises.

Section-shaped compound materials are suitable for reinforcing components which are used in building construction, vehicle construction, lightweight construction or the construction of apparatuses and devices, with the components being in particular ceilings or walls of buildings. The section is applied with a bonding means, i.e. with an adhesive, to the component for reinforcement. In a fiber compound material with a thermoplastic matrix there is the problem that the usual bonding means adhere poorly to thermoplastics. In a stressing of the reinforced component the connection between the section and the bonding means would loosen.

SUMMARY OF THE INVENTION

An object of the invention is to create a compound material in which fibers are embedded in a thermoplastic matrix and which can be secured with a usual bonding means on a component in such a manner that the expected reinforcement function results. This object is satisfied by a compound material according to the present invention.

The compound material comprising fibers which are embedded in a thermoplastic matrix has a free surface to be treated. It has one or more capillary spaces which extend between the fibers, which are at least partly formed by communicating pores and which are open towards the surface to be treated. An average diameter of the pores is greater than, equal to or not substantially less than the fiber diameter.

Advantageous embodiments of the compound material in accordance with the invention, corresponding manufacturing methods, and uses of the compound material in accordance with the invention are described below.

The invention will be explained in the following with reference to the drawings.

DESCRIPTION OF THE PREFERRED EMBODIMENTS

Figure 1:
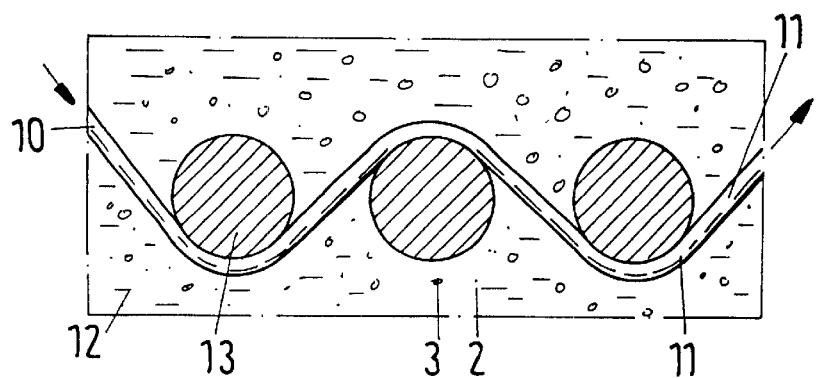
FIG. 1 is an illustration pertaining to a pressure impregnation.

In a pressure impregnation such as is illustrated with reference to the section in FIG. 1, a fiber strand 10 is drawn through a dispersion 12 of an impregnating bath with a predetermined draw-off speed and is impregnated with particles 2 and 3 under the influence of a tool. The tool comprises a plurality of deflection elements 13, at which in each case a pressure impregnation takes place within the range of a wrapping angle. The fiber strand 10 with two broad surfaces 11 consists of a plurality of layers of fibers 1 lying one upon the other. At the deflection elements the fibers which lie in contact with the deflection surface experience a lower tension in the direction of the strand than those lying farther from the deflection surface. The outwardly lying, more taut fibers are drawn in between the inwardly lying ones, through which a spreading of the band transversely to the strand direction results. Particles 2 and 3 which are enclosed at the surface 11 of the strand 10 between the strand and the deflection surface are pressed between the less taut fibers 1, through which an additional spreading of the strand 10 is effected. After this reception phase at the deflection element 13 the strand 10 again arrives into the free dispersion 12, where its surfaces 11 are again charged with particles 2, 3 under the influence of diffusion and adsorption forces. At the following deflection element a pressing in of particles 2, 3 on the other side 11 of the strand 10 takes place.

A first possibility of manufacturing a porous compound material in accordance with the invention consists in using a polymer powder for the impregnation which wets the fibers only partly when melted. This can succeed if the temperature is increased only slightly above the melting temperature. Large pores can be obtained if a polymer powder with large particles (e.g. with diameters greater than 20 $\mu$m) is used. In the consolidation it must be observed that the pores are not closed again through pressures which are too high or as a result of reaction times which are too long.

Figure 2:
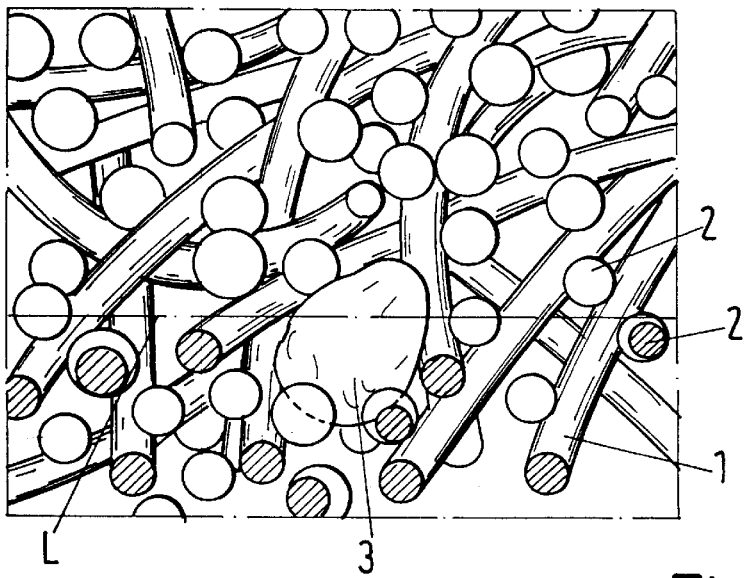
FIG. 2 shows partially, a sample of a fiber band which is impregnated with thermoplastic particles and in which fiber pieces form a heap or pile arrangement.
Figure 3:
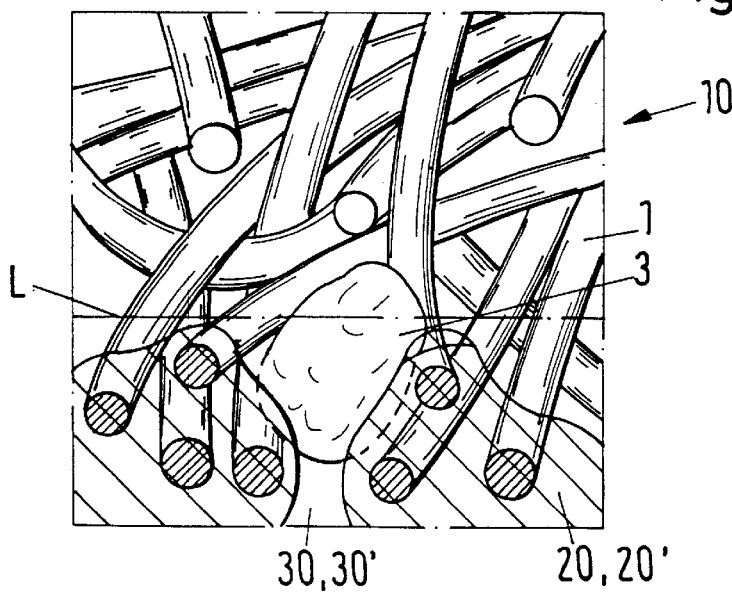
FIG. 3 shows the sample of FIG. 2 after a melting of the thermoplastic.

Further possibilities will be explained with reference to FIGS. 2 to 4. The sample shown in FIG. 2 is illustrated below the horizontal line L as a cross-section, above it as a plan view. The fibers 1 have limited lengths and form a pile or a felt-like arrangement. A particle charging of the fiber pile which is carried out in the impregnation bath leads to an expansion of the pile. FIG. 2 shows the sample after the impregnation bath. The particles which are deposited in between the fibers 1 are thermoplastic particles 2 and additional particles 3 which have been admixed to the thermoplastic particles 2 as foreign bodies. The particle 3 is substantially larger than the particles 2 in accordance with the illustration in FIG. 2. The diameter of the particle 3 amounts to for example 10 to 15 $\mu$m, that of the thermoplastic particles 3 up to 8 $\mu$m. It is also possible that all particles 2 and 3 are largely of equal size. The dimensions of the pores which are to be produced can be influenced by the choice of the particle diameter.

After a drying step the sample of FIG. 2 is carried to a heating, in which the thermoplastic particles 2 are melted, whereas the additional particles 3 remain unchanged. The melted thermoplastic wets the fibers 2 and as a result of the surface tension causes a contraction of the pile which expanded in the impregnation bath. The contracted pile is illustrated in FIG. 3, in plan view without an illustration of the melt, and in cross-section below the line L with an illustration of the melt 20'. The additional particle 3 is not liquefied during the heating and therefore hinders the contraction of the pile locally. In its vicinity the pores 30' between the melted polymer phases 20' therefore remain open. A consolidation leads to a fiber-reinforced thermoplastic band 10 with a polymer matrix 20 in which partly communicating capillary spaces 30 are formed by the pores 30'.

Figure 4:
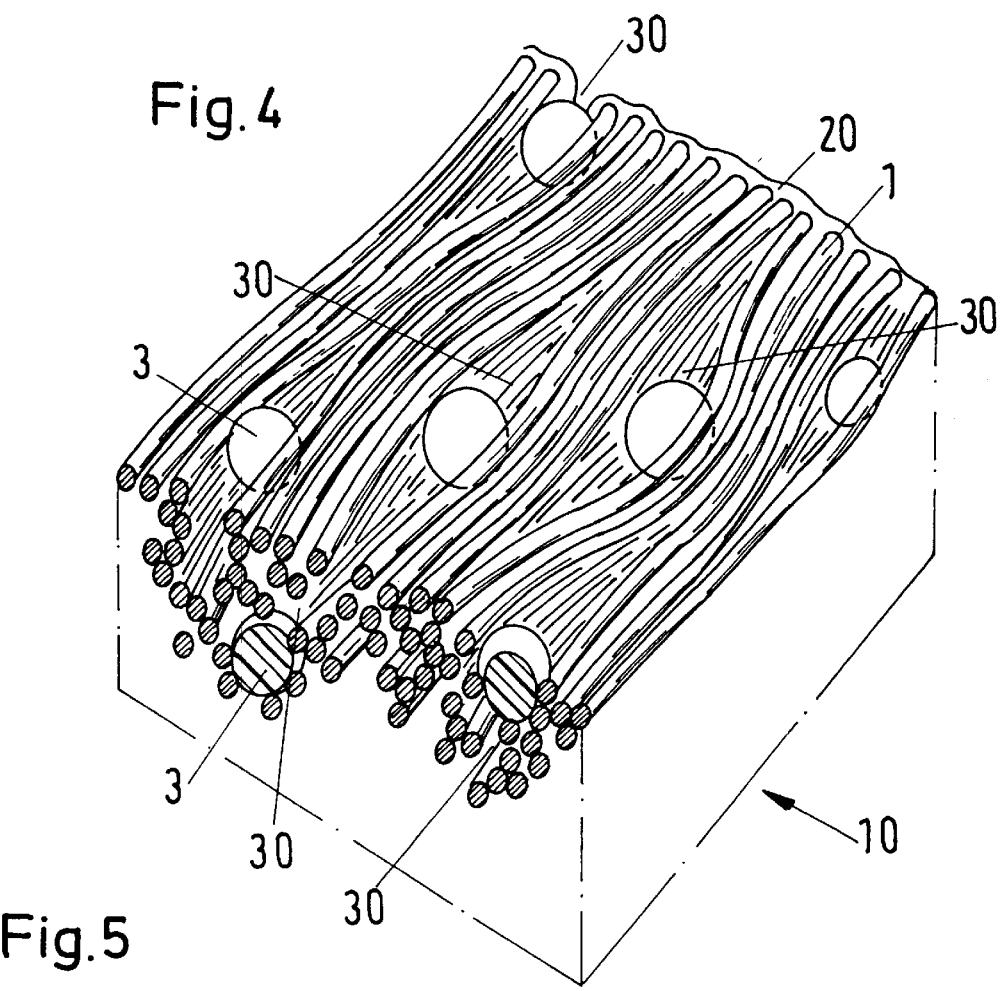
FIG. 4 shows a sample with unidirectionally arranged fibers with particles deposited in the fiber compound.

FIG. 4 shows a sample of a fiber-reinforced thermoplastic band 10 with fibers 1 which form a unidirectional bundle and between which additional particles 3 are embedded. A thermoplastic matrix 20 which has been produced by means of a pressure impregnation is merely indicated with a contour line. Capillary spaces 30, which are deposited in between the fibers in the thermoplastic matrix 20 as foreign bodies, have resulted as in the sample of FIG. 3 under the influence of the additional particles 3.

The additional particles 3 can consist of organic substances, in particular plastics, the melting points of which are at least 10 K higher than the melting point of the thermoplastic matrix. They can also consist of an inorganic material, for example glass or ceramics. During the melting of thermoplastic particles 2 (cf. FIG. 2) the fiber strand which expanded in the impregnation bath contracts, with pores of a capillary space 30, which form in each case in the vicinity of a particle 3, arising due to local hindrances of the contraction.

Figure 5:
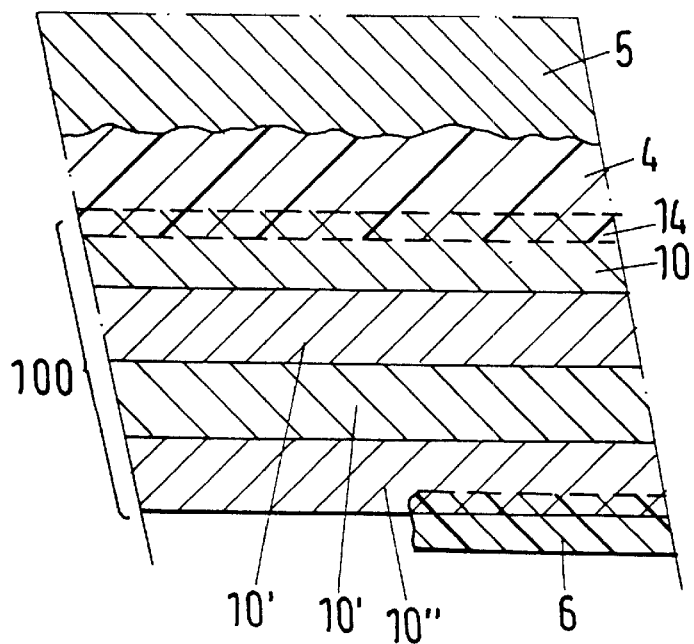
FIG. 5 shows a cross-section through a pultruded section which contains a compound material in accordance with the invention and which is secured to a substrate.

As a rule the compound material in accordance with the invention is composed of a plurality of fiber-reinforced thermoplastic bands. For example, the individual bands are welded together by means of a pultrusion and at the same time are shaped to form a section. In a compound material which has a plurality of layers of the thermoplastic bands arranged one upon the other, porous bands with capillary spaces (or merely one band) are preferably used only for the surface to be treated. FIG. 5 shows an example of a multiple layer compound material 100 of this kind with layers 10, 10' (twice) and 10". The layer 10 is porous and can be applied with a bonding means 4 onto a substrate 5 (wall piece). The bonding means 4 has penetrated in a flowable state into the capillary spaces of the layer 10 in an edge zone 14. The bonding means 4 is chosen such that it forms a resistant bonding between the compound material 100 and the substrate 5 after a solidification.

The lower layer 10" of the compound material 100 can likewise be porous, so that a coating 6 can be applied which can also be bonded to the layer 10" due to an anchoring in capillary spaces. Instead of a relatively thick layer 6 a coat of paint can also be provided.

The individual layers 10, 10', 10" of the compound material 100 can also have different compositions. Thus for example the inner layers 10' can contain glass fibers, whereas the fibers of the boundary layers 10' and/or 10" can be formed of carbon, aramide or PBO. The composition of the polymer matrix can also be variable. Some of the thermoplastic particles 2 can also be replaced by duroplastic particles and/or inorganic particles. This can be advantageous since the bonding means (adhesives) adhere better to duroplastics or to inorganic substances.

In the above-described examples the additional particles 3 are integrating constituents of the compound material 10.

Soluble substances can be used for the material of the additional particles 3 so that these particles 3 can be removed from the matrix after the consolidation of the thermoplastic matrix. Salts, soluble polymers, oligomers, waxes or fats or the like can be used as substances. Organic liquids are possible as solvents, but water is preferably used. If salt crystals are provided as additional particles 3, then a saturated solution of the salt is advantageously chosen in the pressure impregnation for the liquid phase of the dispersion (preferably water).

Foreign substances which are removable through a chemical decomposition, or those (for example oils) which are introduced between the fibers in the impregnation bath as liquid phase and in an emulsified form, also can be used as pore-forming foreign substances. Liquid foreign substances hinder the thermoplastic melting from completely wetting the fibers. The liquid foreign substances can be removed after the consolidation by means of solvents and/or evaporation.

In a further embodiment of a manufacturing process for a compound material in accordance with the invention, additional particles (or all particles) are impregnated with an expanding agent. In a heating phase the particles are melted while liberating the expanding agent, with the expanding agent passing into the gas phase and forming bubbles in so doing. A porous thermoplastic matrix forms from the thus produced foam-like melt during the consolidation.

A method of producing a porous surface at a pultruded section which consists of a compound material involves producing pores through the removal of material. The material can be removed mechanically or using laser procedures. In these procedures the reinforcement fibers are damaged. As a consequence the strength of the section is reduced. In the method in accordance with the invention for manufacturing porous sections, the fibers remain intact, so that the strength which is imparted by the fibers is not impaired.

What is claimed is:

1. A compound material, comprising:
   a thermoplastic matrix; and
   a plurality of fibers embedded in the thermoplastic matrix,
      wherein at least one capillary space having an opening oriented toward a surface of the compound material is formed in the thermoplastic matrix between fibers of the plurality of fibers, the at least one capillary space further having an average diameter that is substantially equal to or larger than an average fiber diameter of the plurality of fibers.

2. The compound material as recited in claim 1, wherein the thermoplastic matrix is produced by means of a pressure impregnation of the plurality of fibers.

3. The compound material as recited in claim 2, wherein the at least one capillary space is formed by introducing one or more foreign bodies between fibers of the plurality of fibers during the pressure impregnation.

4. The compound material as recited in claim 1, wherein the one or more foreign bodies are removed after the at least one capillary space is formed.

5. The compound material as recited in claim 3, wherein at least one of the one or more foreign bodies is not removed after the at least one capillary space is formed.

6. The compound material as recited in claim 3, wherein a ratio of a volume of the foreign bodies to a total volume of the thermoplastic matrix plus the foreign bodies is equal to between about 5% and about 30%.

7. The compound material as recited in claim 3, wherein the one or more foreign bodies include at least one body made of an organic substance having a melting point at least 10 K greater than a melting point of the thermoplastic matrix.

8. The compound material as recited in claim 7, wherein the organic substance is a plastic substance.

9. The compound material as recited in claim 3, wherein the one or more foreign bodies include at least one body made of an inorganic substance.

10. The compound material as recited in claim 9, wherein the inorganic substance is a glass or ceramic substance.

11. The compound material as recited in claim 1, wherein the plurality of fibers forms a substantially unidirectional fiber bundle.

12. The compound material as recited in claim 1, wherein the plurality of fibers includes fiber pieces forming a pile or a felt-like arrangement.

13. A reinforcing structure comprising:
  a plurality of layers of a compound material welded together, wherein each layer comprises:
    a thermoplastic matrix; and
    a plurality of fibers embedded in the thermoplastic matrix, and
  wherein, a layer of the plurality of layers that is located at a surface of the reinforcing structure includes at least one capillary space having an opening oriented toward a surface of the compound material is formed in the thermoplastic matrix between fibers of the plurality of fibers, the at least one capillary space further having an average diameter that is substantially equal to or larger than an average fiber diameter of the plurality of fibers.

14. The compound material as recited in claim 13, wherein, in at least one of the plurality of layers other than the surface layer, capillary spaces having a diameter that is substantially equal to or larger than the average diameter of the plurality of fibers of the at least one layer are not formed.

* * * * *